March 24, 1925.

I. F. KEPLER

TRANSMISSION BELT

Filed July 7, 1922

1,530,774

Inventor
Irwin F. Kepler
By Robert M Pierson
Atty.

Patented Mar. 24, 1925.

1,530,774

UNITED STATES PATENT OFFICE.

IRWIN F. KEPLER, OF AKRON, OHIO, ASSIGNOR TO THE B. F. GOODRICH COMPANY, OF NEW YORK, N. Y., A CORPORATION OF NEW YORK.

TRANSMISSION BELT

Application filed July 7, 1922. Serial No. 573,403.

*To all whom it may concern:*

Be it known that I, IRWIN F. KEPLER, a citizen of the United States, residing at Akron, in the county of Summit and State of Ohio, have invented a certain new and useful Transmission Belt, of which the following is a specification.

This invention relates to power-transmission belts of the side-driving or V type composed of fabric or cord or a combination of these materials, held together and supplemented by vulcanized rubber. My principal object is to increase the flexibility and durability of such belts and enable them to be cheaply manufactured.

Figure 1:
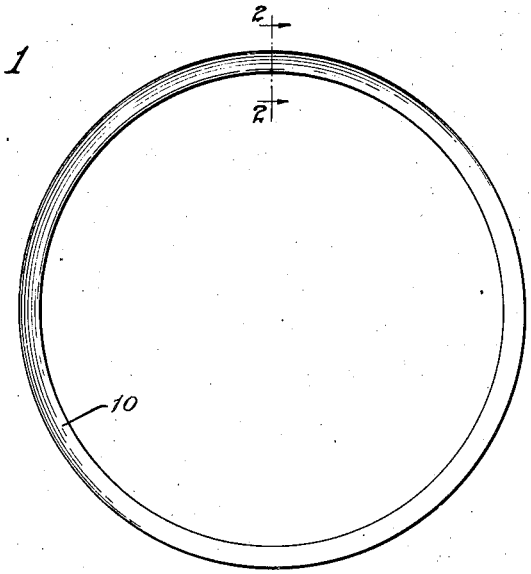

Of the accompanying drawings, Fig. 1 is a side elevation of an endless belt of the type referred to.

Figure 2:
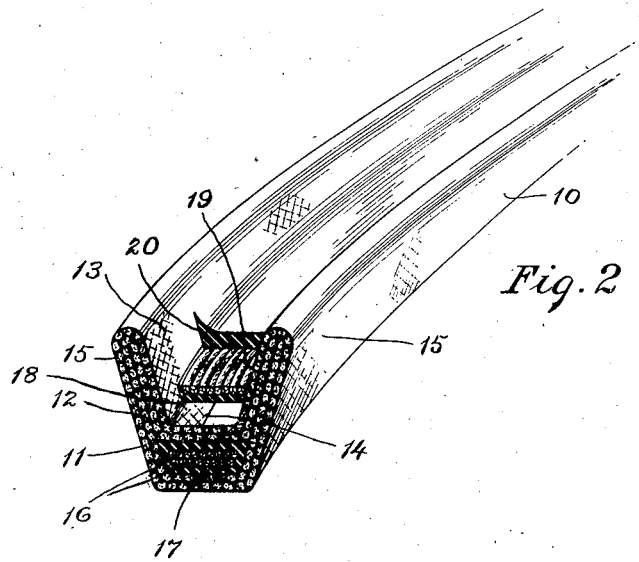

Fig. 2 is a stepped section taken principally on a transverse plane such as 2—2 of Fig. 1.

The present invention is partly an improvement upon that described in my Patent No. 1,425,021 of August 8, 1922, which shows a vulcanized V-belt composed of a cord core, a rubber filler surrounding the core and a rubberized bias fabric cover, the cover and filler at the back or outer periphery being grooved to impart a trough shape which imparts added flexibility.

In the present instance I provide for a deeper and more pronounced trough formation of the bias fabric elements and a novel combination thereof with a rubber filler or fillers and with an inextensible core or cores, so that the internal fabric or cord structure is brought more completely to and below or radially within the middle zone of the belt, thereby increasing the flexibility of the outer peripheral portions of the belt, and also permissibly reducing the amount of material in said outer portions and increasing the heat-dissipating surface.

In the drawings, 10 is an endless belt having a cross-sectional shape adapted to fit in grooved or V pulleys, the belt driving and being driven by its side surfaces acting against the sides of the pulley grooves. The two inclined sides and the inner peripheral surface of the belt are formed by a strip or ply 11 of bias-laid, rubberized, woven fabric, and there is in this case also a second similar strip or ply 12, immediately within the outer ply 11. These two plies, in the present instance, are folded down within the trough formed by the outer portions of the plies to make an inner, shallower trough 13 of two-ply thickness, the edges of whose laminations abut along a longitudinal meeting line 14 at the bottom of the inner trough. Thus there are formed a pair of wings 15 of four-ply thickness with finished outer edges, which provide both lateral and longitudinal flexibility and allow the belt to turn at high speed around a pulley of relatively small diameter without producing an undue amount of internal friction and heating of the belt, while at the same time the belt may be made of any desirable radial depth and faced with fabric for the full width of its driving sides.

In order to avoid undue stretching of the belt as a whole in service, it is desirable to incorporate substantially inextensible elements therein, which elements are preferably in the form of circumferentially-extending fibrous cords or threads, either as layers of separately-wound turns or convolutions, or as strips of weak-wefted thread-fabric or strips of ordinary woven fabric, the threads or strips in either case being preferably coated with rubber before being incorporated in the belt. These inextensible layers may lie either between the plies of bias fabric at the base of the belt or in a position above or outside of all of the bias plies, or in both of these positions. In the present instance, I have shown such inextensible plies or bands in both positions. There are here shown two plies 16, which may be of weak-wefted thread-fabric, laid between the bottom portions of the pairs of bias layers constituting the inner and outer troughs of the plies 11, 12. These longitudinal threads are embedded in a rubber filler 17.

Furthermore, the bottom of the inner trough 13 of bias fabric is overlaid with a rubber filler ply 18, and this is overlaid with a ply or band 19 of longitudinally-extending threads, preferably in the form of weak-wefted thread-fabric, and said ply 19 in turn is overlaid with a filleted ply 20 of rubber, which may join the rubber ply 18 around the edges of the cord strip 19 to constitute an outer rubber filler or bed.

I prefer to leave an open space or groove between the wings 15 for a considerable distance above the rubber filler ply 20, as this contributes to the flexibility of the belt as a whole, and increases the heat-dissipating surface. The necessary degree of lateral stiffness is imparted to the free portions of the wings by incorporating therein a sufficient number of plies of fabric. It is not broadly essential to my invention that the wing plies shall be doubled on each other to make folded outer edges.

It will be observed that there is no fabric, cord or thread structure in the median plane of the belt substantially beyond the middle radial zone of the belt-body, or, in other words, the fabric in the interior of the belt-body is wholly confined to the base portion thereof. That is to say, the usual fabric cover at the outer periphery of the belt is omitted, and it will be evident that this greatly enhances the flexibility of the belt and its ability to withstand rapidly repeated flexures around the pulleys without overheating and disintegration. As an incidental advantage, the amount of material used in the belt is or may be reduced in this way.

The "neutral zone" of the belt, so far as it is defined by the location of the inextensible elements such as the plies 16 and 19, is thereby also located nearer the inner than the outer periphery, but it is to be observed that the provision of rubber cushions or fillers adjacent to the inextensible elements as well as the ability of the longitudinal threads themselves to slightly extend or contract in making the turns, results in a slight relative extension and contraction of the inner and outer margins of this so-called neutral zone when it includes more than a single ply of threads.

A belt of this type may be made by laying and shaping the strips of bias fabric in a suitable trough-shaped form, building up the belt in an obvious manner, and vulcanizing it either in the original form with a suitable filler to preserve the open shape of the trough, together with an outer wrapping or binding, or it may be cured under stretch in an expansible mold.

I claim:

1. A side-driving transmission belt composed primarily of thread or fabric elements and rubber vulcanized together, said belt being surfaced at its sides and inner periphery with bias fabric forming terminal edges at the side edges of the outer periphery of the belt, and an inextensible band of longitudinal threads located substantially in the inner half of the belt, together with a rubber filler lying between the wings of the belt and wholly outside of its fabric or thread elements in a radial direction.

2. An endless, vulcanized rubber and fabric belt having a trough-shaped body, including wings of bias fabric, and an inextensible band of longitudinal threads lying between said wings and forming in a radial direction the outermost fabric or threaded elements of the middle portion of the belt.

3. An endless, vulcanized rubber and fabric belt having a trough-shaped body, including wings of bias fabric, an inextensible band of longitudinal threads lying between said wings and forming in a radial direction the outermost fabric or thread elements of the middle portion of the belt, and a layer of rubber overlying said band between the wings.

4. A side-driving transmission belt of vulcanized rubber and fabric comprising nested troughs of bias fabric forming terminal edges at the sides of the outer periphery, the bottom of the interior trough lying substantially in the inner half of the belt, and a substantially inextensible core lying between the bottom portions of the two troughs.

5. An endless, vulcanized, rubber and fabric, side-driving belt comprising nested troughs of bias fabric, an inextensible band of longitudinal threads lying between the bottoms of the troughs, and a second inextensible band of longitudinal threads lying radially outside of the bottom of the inner through.

6. An endless, side-driving transmission belt of vulcanized rubber and fabric comprising nested troughs of bias fabric, inextensible bands of longitudinal threads lying radially inside and outside of the bottom of the inner trough, substantially in the inner half of the belt, and rubber fillers embedding said bands.

7. An endless, side-driving, vulcanized transmission belt comprising a strip of bias rubberized fabric folded on itself at the outer peripheral edges of the belt to form nested troughs including a pair of side wings, and a band of longitudinal threads overlying the bottom of the inner trough.

8. An endless, side-driving, vulcanized, transmission belt, deeply grooved or open between its sides at the outer periphery, and comprising plural trough-shaped laminations of bias fabric and an inextensible band of threads, the fabric or thread elements in the median plane being substantially confined wholly to the inner half of the belt.

9. An endless, side-driving, vulcanized transmission belt comprising superposed strips of bias fabric folded on itself at the outer periphery to form plural-ply, nested troughs, and an inextensible band of longitudinally-extending threads in the base of said belt.

In witness whereof I have hereunto set my hand this 30 day of June, 1922.

IRWIN F. KEPLER.